US007478436B1

(12) United States Patent
Shieh et al.

(10) Patent No.: US 7,478,436 B1
(45) Date of Patent: Jan. 13, 2009

(54) SYSTEM AND METHOD FOR PROVIDING LAST LOG-IN SCREEN SHOTS FOR SECURITY CONFIRMATION

(75) Inventors: Johnny M. Shieh, Austin, TX (US); Gerald Francis McBrearty, Austin, TX (US); Shawn P. Mullen, Buda, TX (US); Susann Keohane, Austin, TX (US); Jessica Carol Murillo, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/015,665

(22) Filed: Jan. 17, 2008

(51) Int. Cl.
*G06F 7/04* (2006.01)
(52) U.S. Cl. .............................. 726/28; 726/26; 726/27; 726/29; 713/185
(58) Field of Classification Search .................. 726/26, 726/27, 28, 29; 713/185; 707/9, 10; 715/764, 715/867
See application file for complete search history.

(56) References Cited

U.S. PATENT DOCUMENTS

| 6,741,586 | B1 | 5/2004 | Schuster et al. | |
|---|---|---|---|---|
| 7,165,051 | B2 * | 1/2007 | Ronning et al. | ............... 705/64 |
| 2002/0032677 | A1 | 3/2002 | Morgenthaler et al. | |
| 2002/0165922 | A1 | 11/2002 | Wei | |
| 2005/0010639 | A1 | 1/2005 | Long et al. | |
| 2007/0150500 | A1 | 6/2007 | Kawada et al. | |
| 2007/0168379 | A1 | 7/2007 | Patel et al. | |
| 2007/0179955 | A1 * | 8/2007 | Croft et al. | ..................... 707/9 |
| 2008/0046738 | A1 * | 2/2008 | Galloway et al. | ........... 713/176 |

\* cited by examiner

*Primary Examiner*—KimYen Vu
*Assistant Examiner*—Edward Zee
(74) *Attorney, Agent, or Firm*—Maxvalueip, LLC

(57) ABSTRACT

A system for providing additional network security of a user for a web-based system. Two methods of the same basic idea for additional network security for online accounts: (1) Passive screensaver check: a method to take a snapshot of your desktop and save it, and (2) Active screensaver check: a method to take a snapshot of your desktop and compare it to a baseline snapshot of your desktop.

1 Claim, 2 Drawing Sheets

SYSTEM AND METHOD FOR PROVIDING LAST LOG-IN SCREEN SHOTS FOR SECURITY CONFIRMATION

BACKGROUND OF THE INVENTION

The present invention embodies an improved method of providing additional network security of a user for a web-based system. Many of our personal financial transactions are done online these days: banking, shopping, document processing, etc. As the number of personal transactions handled online have grown, so has the risk of having personal accounts compromised. Sometimes, when one logs in onto the computer to check your bank or credit card balance, one might see a large disparity between what they believe the account balance should be and what they see. The first thing one thinks is, "I've been breached. Someone has been here since I last visited and made transactions without my knowledge." Then as one is frantically double-checking their accounts, they may deduce that they had forgotten a large transfer or purchase— which explains the balance gap.

There is a need for a visual method to confirm that you were the last visitor to the site and to use that information in a safeguarding manner.

This idea is needed because sometimes people need a quick visual confirmation that they were the last ones to visit their site. Many times, people may break into a computer account and not do anything that particular visit. Or, if it is to steal or compromise information, they may learn your private information and not alter anything.

It would be good to have a passive way and an active way to detect non-changing snooping on your personal accounts.

SUMMARY OF THE INVENTION

The present invention relates generally to a web-based access system, and more particularly, to a system for providing additional network security of a user for a web-based system.

Two methods of the same base idea for additional network security for online accounts:
1—Passive screensaver check—a method to take a snapshot of your desktop and save it.
2—Active screensaver check—a method to take a snapshot of your desktop and compare it to a baseline snapshot of your desktop.

DETAILED DESCRIPTION OF THE PREFERRED EMBODIMENTS

Figure 1:
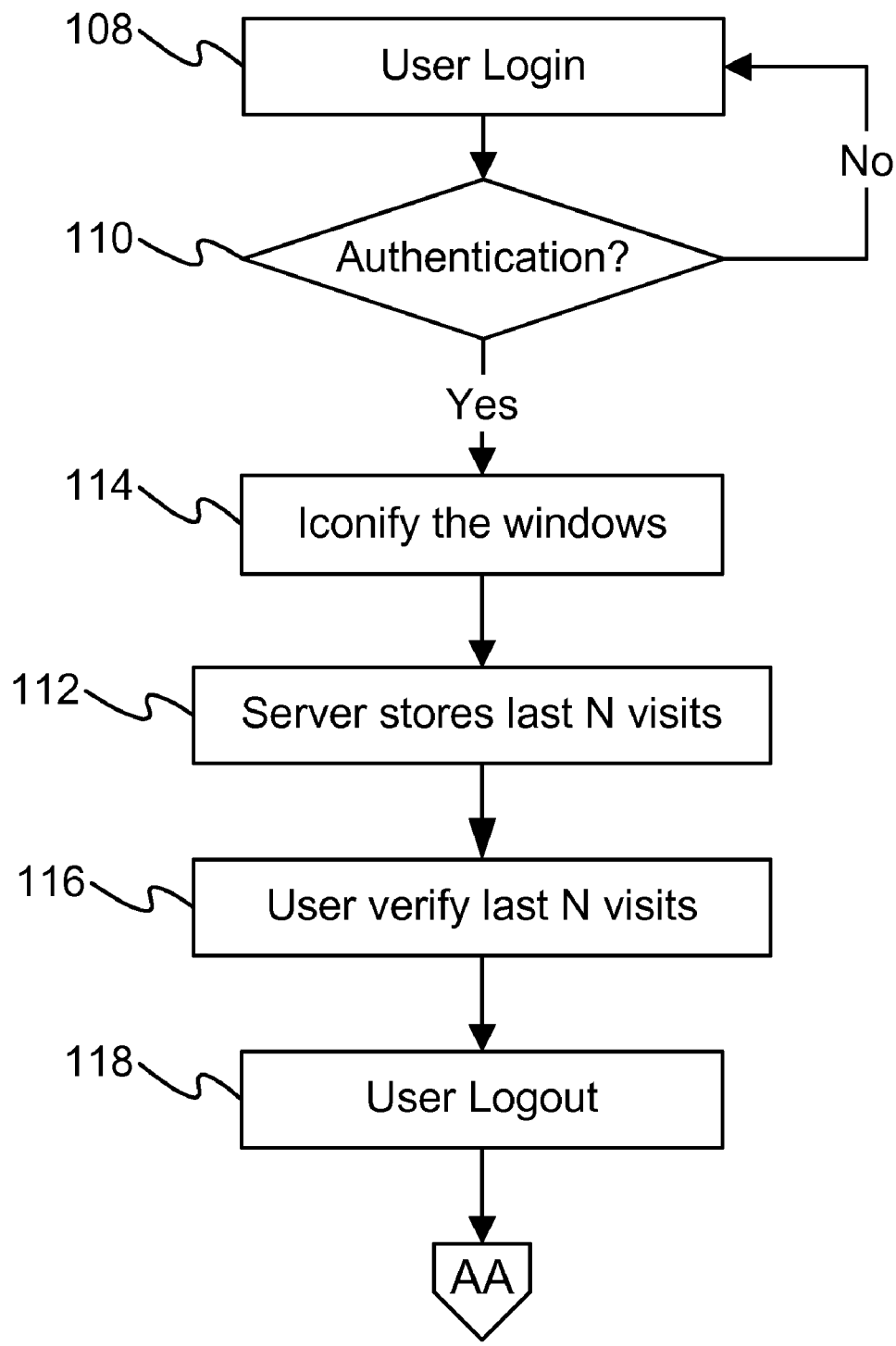
FIG. 1 is a schematic diagram of the Passive screensaver check.

Before providing examples of the passive and active methods, we will explain what we mean by screenshot. The basic idea is that the snapshot or image of your computer desktop is taken and stored into a JPEG or GIF file. For open windows, such as the browser, you have to have it opened to even access your account. With this patent idea, one of the signals that are sent from the server to the browser to your computer is the command to iconify all open windows and after the screenshot is taken and sent back to the server, the iconified windows are re-opened. For this snapshot, there are two proposed methods: automatic and permission.

Automatic—you have given prior permission for this web site to send your computer an "ICONIFY ALL WINDOWS" command.

Permission—each time the web site would like to take a screenshot, it asks you if you agree to it. Upon selecting YES, the ICONIFY ALL WINDOWS command is sent to your computer.

Passive screensaver check—
1) You have your browser open.
2) You log into your bank account.
3) After you type in the password:
   a) The server verifies that the password is correct.
   b) It issues either an automatic or permission request to iconify the windows in your desktop.
   c) It issues a command to take a snapshot of your computer desktop (this is similar to the function "Print Screen" on some laptop buttons).
   d) This image is sent back to the server.
4) The server then stores this as a jpeg or gif either hidden or publicly viewable (this will be explained later).
5) The user has the ability to have the account server store the last N-visits so one can see who has visited.
6) If the user decides to check, they can look at the last N-visits and visually verify they can identify the desktop from which this account was visited the last N-times.

This is the key idea behind this patent. One can look at an image and say, "Hey, that doesn't look at all like any desktop I've used the last N times I accessed my account. I'd better consider changing my password or alerting my credit card company that my account may have been compromised."

Active screensaver check—
The steps (1)-(5) are identical to the Passive screensaver check. However, there are new steps:
6) The web site will then take the recently snapped background image and compare it with the last N−1 images.
7) The user has set a "diff threshold" which allows a percentage of the image to be different. Let's say the number is 15%.
8) The program takes images 1 through (N−1) and compares it to the current image N.
9) If ONE of the 1 through (N−1) differs from N by 15% or less, then this is considered a valid desktop and the user is allowed to continue.
10) If all images differ by 16% or more, then the user is asked to answer one of the private security questions stored in the database.
11) If the user fails this, then the account is locked by the web site.

Here are some scenarios users come across:
User desktops often change with icons added or deleted, in this scenario the threshold value comes in. It allows a user-selected delta difference to take into account how often a person thinks their desktop changes between login into the account.
If user has a rotating background image in this scenario the concept of storing the last N-snapshots comes into effect, the user, can specify the number N.
If someone has broken into user account and fake out their background so that every time they visit their background will match user: In this situation the option of storing the jpeg or gif publicly or hidden is offered. The 1 through N−1 old images may be stored in another directory that is protected by a secondary password or public-private key encryption.

Thus, the intruder will never know what your computer(s) backgrounds may be.

Referring more particularly to the drawings, FIG. 1 is a schematic diagram of the Passive screensaver check. In one embodiment, a given operation, the user logs in with user id and password (108). The server verifies the user credentials are valid (110). It issues either an automatic or permission request to iconify the windows in your desktop (114), it issues a command to take a snapshot of your computer desktop (this is similar to the function "Print Screen" on some laptop buttons), this image is sent back to the server, the server then stores this as a jpeg or gif either hidden or publicly viewable (112). The user has the ability to have the account server store the last N-visits so one can see who has visited. If the user decides to check, they can look at the last N-visits and visually verify they can identify the desktop from which this account was visited the last N-times (116). Once user completed his session he logs off (118).

Figure 2:
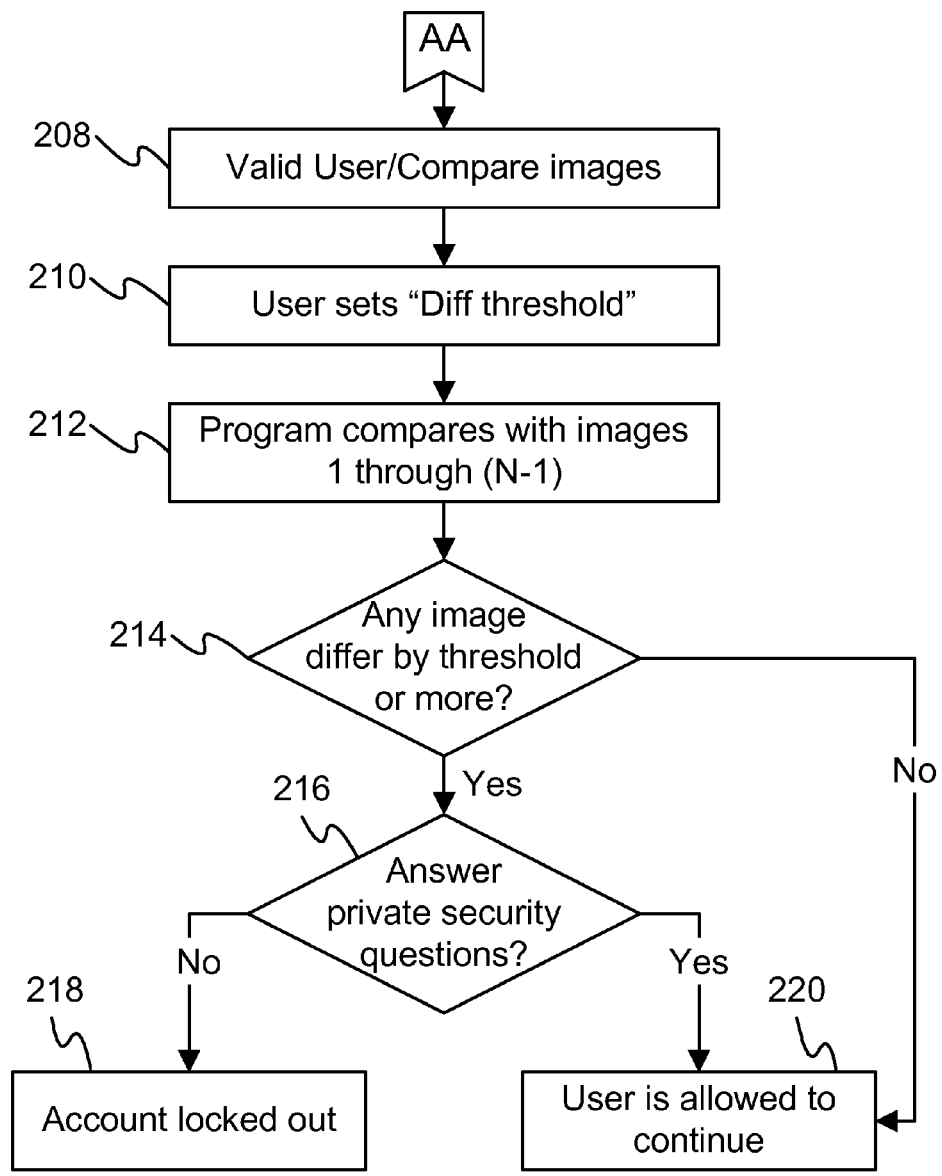
FIG. 2 is a schematic diagram of the Active screensaver check.

FIG. 2 is a schematic diagram of the of the Active screensaver check. In one embodiment a given operation the user logs in with valid user id and password the web site will then take the recently snapped background image and compare it with the last N−1 images (208). The user has set a "diff threshold" which allows a percentage of the image to be different. Let's say the number is 15% (210). The program takes images 1 through (N−1) and compares it to the current image N (212). If ONE of the 1 through (N−1) differs from N by 15% or less, then this is considered a valid desktop and the user is allowed to continue (220). If all images differ by 16% or more (214), then the user is asked to answer one of the private security questions stored in the database (216). If the user fails this, then the account is locked by the web site (218).

In one embodiment, it is a method to provide log-in screenshots for security confirmation for a user, the method comprising:

a security module controlling an access of the user to a file, web site, service, object, information, data, database, code, executable, or transaction;

the user logging into an account using one or more of the following: a first password, smart card, biometrics, encryption key, radio-frequency identification tag, identification card, or magnetic card;

the security module verifying the logging procedure for the user to the account;

iconifying all files and objects on display in windows for the user's computer or monitor;

taking one screen shot from the display;

storing the one screen shot from the display in a first storage;

comparing the one screen shot from the display to one or more prior screen shots, obtained during prior log-in sessions for the user, stored in the first storage;

if the user applies a second password, then allowing the user to access or view the one or more prior screen shots, stored in the first storage;

if the difference between the one screen shot from the display and the one or more prior screen shots is above a threshold, then the security module locking the account, and the security module asking a private security question from the user to further verify the identity of the user; and if the difference between the one screen shot from the display and the one or more prior screen shots is below the threshold, then the security module allowing the user accessing the account.

Any variations of the above teaching are also intended to be covered by this patent application.

The invention claimed is:

1. A method to provide log-in screenshots for security confirmation for a user, said method comprising:

a security module controlling an access of said user to a file, web site, service, object, information, data, database, code, executable, or transaction;

said user logging into an account using one or more of the following: a first password, smart card, biometrics, encryption key, radio-frequency identification tag, identification card, or magnetic card;

said security module verifying said logging procedure for said user to said account;

iconifying all files and objects on display in windows for said user's computer or monitor;

taking one screen shot from said display;

storing said one screen shot from said display in a first storage;

comparing said one screen shot from said display to one or more prior screen shots, obtained during prior log-in sessions for said user, stored in said first storage;

if said user applies a second password, then allowing said user to access or view said one or more prior screen shots, stored in said first storage;

if the difference between said one screen shot from said display and said one or more prior screen shots is above a threshold, then said security module locking said account, and said security module asking a private security question from said user to further verify the identity of said user; and if the difference between said one screen shot from said display and said one or more prior screen shots is below said threshold, then said security module allowing said user accessing said account.

\* \* \* \* \*